Patented Mar. 14, 1950

2,500,918

UNITED STATES PATENT OFFICE 2,500,918

ACYLATION OF HYDROXYLATED ESTERS

Louis F. Reuter and Aldrich Syverson, Akron, Ohio, assignors to The B. F. Goodrich Company, New York, N. Y., a corporation of New York No Drawing. Application August 10, 1945, Serial No. 610,213

4 Claims. (Cl. 260—405)

This invention relates to a method for acylating esters of ricinoleic or hydrogenated ricinoleic acid and to the products obtained thereby.

It has previously been proposed to acetylate various esters of ricinoleic or hydrogenated ricinoleic acid (12-hydroxy stearic acid) by heating a mixture of the ricinoleic esters with a large excess of acetic anhydride at the boiling point of the mixture. The acetylated ricinoleates so prepared have been found to be very useful as plasticizers for vinyl resins, particularly for polymers and copolymers of vinyl chloride. These plasticized polymer compositions are widely used as electrical insulation. The acetylated ricinoleates prepared by heating the ricinoleic ester with acetic anhydride, as described above, have suffered from the disadvantage, however, that the electrical resistivity of polymer compositions plasticized with them has been undesirably low.

It has now been found that acylated ricinoleates prepared by the method herein described, when used as plasticizers for vinyl resins, result in compositions having an electrical resistivity more than three times as great as that of similar compositions containing acylated ricinoleates prepared by the methods hitherto known. The method of the invention comprises maintaining a mixture of the ricinoleic or similar ester and the desired acid anhydride at an elevated temperature from about 175° to 260° C., preferably 190° to 250° C., for a short period of time, from 2 to 20 minutes. This combination of high temperature and short time for the reaction is critical to the success of the process. It is preferred to remove as much as possible of the acid formed as one of the products of the reaction from the reaction zone and from the acylated ester during the course of the reaction, and it is preferred that the reaction be carried out in the absence of oxygen or air. Although catalysts, such as sulphuric acid, hydrochloric acid, or the like, may be used for the reaction, it is preferred to employ no catalyst, thus making unnecessary the separation of any residual catalyst from the product. Although the reaction may be carried out as a batch operation, best results are generally obtained by employing a continuous process, since it facilitates control of the temperature and time of the reaction.

The esters which may be employed in the process of this invention include esters of hydroxy-substituted 18 carbon atom aliphatic monocarboxylic acids, such as methyl ricinoleate, ethyl ricinoleate, butyl ricinoleate, phenyl ricinoleate, tolyl ricinoleate, benzyl ricinoleate, cyclohexyl ricinoleate, castor oil, hydrogenated castor oil, methyl 12-hydroxystearate, ethyl 12-hydroxystearate, isoamyl 12-hydroxystearate, and the like.

The acid anhydrides which may be employed in the process of this invention include any short chain fatty acid anhydride, or more specifically fatty acid anhydrides containing from 4 to 8 carbon atoms such as, acetic anhydride, propionic anhydride, butyric anhydride, or isobutyric anhydride.

The time of the reaction, as was pointed out above, is critical; when the reaction is carried out at 175° C., as much as 15 to 20 minutes may be necessary for completion of the reaction, but at higher temperatures less time is required; at 260° C., as little as 2 minutes may be necessary for completion of the reaction; in general 6 to 10 minutes is preferred. The time of reaction will vary inversely with the temperature employed, in general, but in no case should it exceed 20 minutes. If more than 20 minutes is employed for the reaction, particularly near the upper limit of the temperature range, appreciable decomposition of the product occurs. The relative proportion of the reagents employed is not critical, although it is generally desirable to use an excess of the acid anhydride above the amount theroretically required, because separation of the excess anhydride from the desired product is more readily accomplished than is the separation of excess ester therefrom, and because the velocity of the reaction is increased in accordance with the law of mass action. In general, from about 20 to about 200% excess of the acid anhyride above the amount theoretically required may be employed, preferably from about 50 to about 125% excess.

The pressure at which the reaction is carried out is not critical; satisfactory results may be obtained at approximately atmospheric pressure. Solvents or diluents which are inert to the reaction may be employed if desired, although this step is not necessary. The cool reactants may be mixed before introduction into the chamber, or they may be separately introduced. Each of the reactants may be preheated before introduction into the reaction chamber, or the heating may be accomplished in the reaction chamber itself. If the reactants are preheated, it is preferred that the heating step be as rapid as possible, at least during that time that the temperature of the reactants, particularly the hydroxylated ester is above 150° C., and that the heating be carried out in the absence of oxygen. If suitable heat-exchangers are employed for this purpose, as described in the following specific examples, the temperature of the hydroxylated ester may be raised from room temperature to over 200° C. in less than two minutes. Best results are obtained when the total time during which the hydroxylated ester reactant is maintained at a temperature above 150° C., exclusive of the time inside the reaction chamber, is less than ten minutes. The rate of heating of the fatty acid anhydride, or the length of time it is maintained at an elevated temperature, is not critical. If one or both of the reactants are preheated, they should not be mixed until they are inside the reaction chamber. Both reactants may be used in the liquid phase, or the anhydride may be in the vapor phase, depending upon the particular anhydride employed and the temperature and pressure conditions. Best results are obtained by employing a countercurrent flow of preheated reactants within the reaction chamber.

The following specific examples are intended as a further illustration of the nature of this invention and not as a limitation upon the scope of the appended claims.

*Example I*

Castor oil was heated to about 195° C. by passage through a heat-exchanger consisting of an eleven-foot length of one-quarter inch pipe heated with high-pressure steam and electrical resistance coils. The total time required for passage of any portion of the castor oil through the heat-exchange tube was about 1.5 minutes, the rate of flow being 0.32 lb. per minute. The stream of preheated castor oil was introduced at the top of a reaction chamber which consisted of a heat-insulated vertical glass column 10 ft. long and 2 in. in diameter, packed with Berl saddles. Acetic anhydride vapor from a boiler at a temperature of about 140° to 160° C. was continuously introduced a few inches from the bottom of the column at the rate of 0.18 lb. per minute (about 70% excess over the amount theoretically required). After the first few minutes of operation, when the system had become stabilized, there was no air remaining in the reaction chamber, and the temperature at the center of the column was about 190° C. A mixture of acetic anhydride and acetic acid in the vapor phase (over 80% of the total acetic acid formed) was continuously removed from the top of the column at the rate of 0.07 lb. per minute, and the crude product, consisting of acetylated castor oil and a small amount of acetic anhydride and acetic acid, was continuously withdrawn from the bottom of the column at the rate of 0.43 lb. per minute. The total time required for the passage of any given portion of castor oil through the column was about 7 minutes. Immediately after its withdrawal from the reaction chamber, the product was cooled rapidly to a temperature below 100° C. The excess acetic anhydride and the remaining acetic acid were then removed from the product by heating it to 150° C. at a pressure of 25 mm., followed by blowing superheated steam through it at the same temperature and pressure for about 40 minutes. The purified product had a saponification value of 298 and an acid number of 0.11. The yield was 98% of the theoretical amount based on the amount of castor oil used.

*Example II*

Castor oil preheated to 223° C. and acetic anhydride vapor at 140° to 160° C. were continuously reacted as described in the preceding example, the rates of flow being 0.258 lb. per minute and 0.146 lb. per minute, respectively, and the temperature in the center of the column being 197° C. A mixture of acetic anhydride and acetic acid in the vapor phase was continuously removed from the top of the column at the rate of 0.05 lb. per minute, and a mixture of acetylated castor oil with a small amount of acetic anhydride and acetic acid was continuously withdrawn from the bottom of the column at the rate of 0.354 lb. per minute. The total time required for passage of any given portion of castor oil through the column was about 6 minutes. Separation of the remaining acetic acid and the excess acetic anhydride from the acetylated castor oil was carried out as described in the preceding example. The purified product had a saponification value of 298 and an acid number of 0.10. The yield was 98% of the theoretical amount based on the amount of castor oil employed. The products of these specific examples were then employed as plasticizers in the following compositions, in which the parts are by weight:

|  | A | B |
| --- | --- | --- |
| Polyvinyl chloride | 100 | 100 |
| Clay | 7 | 7 |
| Basic lead carbonate | 10 | 10 |
| Dioctyl phthalate | 35 | 35 |
| Product of Example I | 25 | --- |
| Product of Example II | --- | 25 |

The ingredients were mixed on a roll mill at 300° F. and then molded into discs, which were tested for electrical resistivity at 70° C. Composition A was found to have an electrical resistivity of 1209 ohm-cm. $\times 10^9$, and composition B 1393 ohm-cm. $\times 10^3$. When the products of the specific examples in the foregoing compositions were replaced with acetylated castor oil prepared by boiling a mixture of castor oil with an excess of acetic anhydride at atmospheric pressure and purified in the same manner as the products of the specific examples, the electrical resistivity of the resulting composition was less than 400 ohm-cm. $\times 10^9$. Similar results may be obtained with other hydroxylated esters and other acid anhydrides within the scope of this invention.

The acylated esters produced by the process herein described may be purified by methods other than the one described in the specific examples. One or more flashes at 100°–200° C. at reduced pressure, followed by steam stripping at atmospheric or reduced pressure, may be employed. The product need not be cooled before flashing, but may be passed directly into the flash pot from the reaction chamber, allowing the heat of vaporization of the excess acid anhydride to cool the product during the flashing step. If desired, the flashing step may be omitted; or both the flashing step and the steam stripping may be omitted and replaced with a water washing step at either room temperature or at elevated temperature.

Although specific embodiments of the invention have been described, it is not intended to limit the invention solely thereto, but to include all of the obvious variations and modifications falling within the spirit and scope of the appended claims.

We claim:

1. In the process of acylating castor oil with a saturated monobasic fatty acid anhydride containing from 4 to 8 carbon atoms, the steps which include rapidly preheating a quantity of liquid castor oil to a temperature in the range of 175 to 260° C., introducing vapors of said anhydride into said preheated castor oil, maintaining the resulting liquid-vapor mixture in a zone of reactive contact at a temperature in said range for a period of time sufficient for substantial completion of reaction therebetween but less than 20 minutes, while removing vapors of fatty acid formed by the reaction from said zone, rapidly cooling the liquid acetylated castor oil formed by the reaction so that the total time during which the said castor oil reactant and the resulting acylated product are above a temperature of 150° C. is less than 30 minutes, and finally separating the acetylated castor oil from any unreacted acid anhydride and from any remaining fatty acid formed by the reaction.

2. The method of claim 1 in which the fatty acid anhydride is acetic anhydride.

3. The method of claim 1 in which the castor oil is preheated to a temperature in the range of 190° to 250° C. and in which the fatty acid anhydride is acetic anhydride and is present in excess of the amount theoretically required to react with said castor oil but not more than a 200% excess.

4. In the process of acetylating castor oil with acetic anhydride, the steps which include rapidly preheating said castor oil to a temperature from about 190° to about 250° C., vaporizing said acetic anhydride, continuously introducing said preheated castor oil and said acetic anhydride vapors as separate streams into a defined zone of reactive contact, said separate streams of heated castor oil and acetic anhydride being introduced to said zone so that said anhydride vapor flows countercurrent to said preheated castor oil, the amount of said acetic anhydride introduced being in excess of the amount theoretically required to react with said castor oil but not more than a 200% excess, maintaining said heated castor oil and said acetic anhydride vapors in said zone of reactive contact for a period of 6 to 10 minutes, continuously removing a substantial proportion of the acetic acid formed from one portion of said zone during the course of the reaction, continuously removing the acetylated castor oil from a second portion of said zone separated from the first said portion, rapidly cooling said acetylated castor oil as it is withdrawn from said zone so that the total time during which the said castor oil reactant and acetylated product are above a temperature of 150° C. is less than 10 minutes exclusive of the time in said reaction zone, and finally separating said acetylated castor oil from any unreacted acid anhydride and from any remaining acetic acid formed by the reaction.

LOUIS F. REUTER.
ALDRICH SYVERSON.

REFERENCES CITED

The following references are of record in the file of this patent:

UNITED STATES PATENTS

| Number | Name | Date |
|---|---|---|
| 2,168,325 | Colbeth | Aug. 8, 1939 |
| 2,210,305 | Rheineck | Aug. 6, 1940 |
| 2,212,385 | Brod | Aug. 20, 1940 |
| 2,240,437 | Colbeth | Apr. 29, 1941 |
| 2,404,204 | Agens | July 16, 1946 |